United States Patent
Parekh et al.

(10) Patent No.: US 10,817,194 B2
(45) Date of Patent: Oct. 27, 2020

(54) SYSTEMS AND METHODS FOR IDENTIFYING UNUSED STORAGE CAPACITY WITHIN A COMPUTER NETWORK

(71) Applicant: JPMorgan Chase Bank, N.A., New York, NY (US)

(72) Inventors: Ashish Pravinchandra Parekh, Singapore (SG); Roopesh Francis, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/977,488

(22) Filed: May 11, 2018

(65) Prior Publication Data
US 2018/0329639 A1 Nov. 15, 2018

Related U.S. Application Data

(60) Provisional application No. 62/504,647, filed on May 11, 2017.

(51) Int. Cl.
*G06F 3/06* (2006.01)
*G06F 11/34* (2006.01)

(52) U.S. Cl.
CPC .......... *G06F 3/0631* (2013.01); *G06F 3/0605* (2013.01); *G06F 3/067* (2013.01); *G06F 3/0608* (2013.01); *G06F 3/0653* (2013.01); *G06F 11/3485* (2013.01)

(58) Field of Classification Search
CPC .... G06F 3/0605; G06F 3/0608; G06F 3/0631; G06F 3/0653; G06F 3/067; G06F 11/3433; G06F 11/3485

USPC ................................ 711/148, 170, 171, 172
See application file for complete search history.

(56) References Cited

U.S. PATENT DOCUMENTS

| | | | |
|---|---|---|---|
| 8,381,217 B1 * | 2/2013 | Wijayaratne | G06F 9/50 709/223 |
| 8,473,708 B1 * | 6/2013 | Singhal | G06F 3/0619 711/153 |
| 2006/0271341 A1 | 11/2006 | Brown et al. | |
| 2010/0058023 A1 * | 3/2010 | Tan | G06F 3/0605 711/202 |

(Continued)

OTHER PUBLICATIONS

U.S. Appl. No. 15/918,504, filed Mar. 2018, Marvin et al.
(Continued)

*Primary Examiner* — Gary J Portka
(74) *Attorney, Agent, or Firm* — Greenberg Traurig LLP

(57) ABSTRACT

Systems and methods for identifying unused storage capacity within a computer network are disclosed. In one embodiment, in an information processing apparatus comprising at least one computer processor, a method for identifying unused storage capacity within a computer network may include: (1) querying a plurality of computing systems for each system's usage of a plurality of storage devices within a computer network; (2) receiving, from each of the computing systems, raw data comprising a logical identifier and a unique identifier for each storage device used; (3) processing the raw data to identify a correlation between the logical identifier and the unique identifier and a physical storage device; and (4) identifying one of the physical storage device that is not in use.

20 Claims, 2 Drawing Sheets

(56) References Cited

U.S. PATENT DOCUMENTS

| | | | | |
|---|---|---|---|---|
| 2013/0086352 A1* | 4/2013 | Annepu | ................ | G06F 3/0605 |
| | | | | 711/170 |
| 2013/0268644 A1* | 10/2013 | Hardin | ................ | H04L 61/1582 |
| | | | | 709/223 |
| 2017/0026265 A1 | 1/2017 | Hrischuk et al. | | |

OTHER PUBLICATIONS

International Searching Authority, International Search Report and Written Opinion, International Patent Application No. PCT/US18/32203, dated Aug. 1, 2018, pp. 1-6.

* cited by examiner

SYSTEMS AND METHODS FOR IDENTIFYING UNUSED STORAGE CAPACITY WITHIN A COMPUTER NETWORK

RELATED APPLICATIONS

The present application claims priority to U.S. Provisional Patent Application Ser. No. 62/504,647, filed May 11, 2017, the disclosure of which is hereby incorporated, by reference, in its entirety.

BACKGROUND OF THE INVENTION

1. Field of the Invention

Embodiments of the present invention generally relate to systems and methods for identifying unused storage capacity within a computer network.

2. Description of the Related Art

Servers, such as IBM Power platforms running IBM's AIX Virtual IO Servers ("VIOS") and logical partitions ("LPARs"), often have a significant amount of unused storage area network ("SAN") storage capacity. There is no mechanism to accurately detect the unused san storage disk level out of total allocated capacity.

The AIX platform is preferred for heavy data and I/O-intensive workloads with massive SAN allocations. Moreover, by design, SAN allocation in shared environment for clusters and virtual IO servers is extremely complex.

For change planning, risk remediation, hygiene, operational stability, storage migrations and few production incident handling on AIX LPAR and VIO servers, getting end-to-end storage disk allocation, configuration and usage details often requires the execution of several system administration commands and manual co-relations. This is a time-consuming process.

SUMMARY OF THE INVENTION

Systems and methods for identifying unused storage capacity within a computer network are disclosed. In one embodiment, in an information processing apparatus comprising at least one computer processor, a method for identifying unused storage capacity within a computer network may include: (1) querying a plurality of computing systems for each system's usage of a plurality of storage devices within a computer network; (2) receiving, from each of the computing systems, raw data comprising a logical identifier and a unique identifier for each storage device used; (3) processing the raw data to identify a correlation between the logical identifier and the unique identifier and a physical storage device; and (4) identifying one of the physical storage devices that is not in use.

In one embodiment, the logical identifier may include a logical unit number, and the unique identifier comprises a unique device identifier.

In one embodiment, the step of identifying one of the physical storage device that is not in use may include querying each physical storage device for usage activity. The usage activity may be IOPS executed on the physical storage device, reads or writes executed on the physical storage device, etc.

In one embodiment, the method may further include decommissioning the physical storage device. In another embodiment, the method may further include reallocating the physical storage device.

In one embodiment, the computing system may include a VIOS system, an AIX system, a Linux system, a Windows system, etc.

According to another embodiment, a system for identifying unused storage capacity within a computer network may include a plurality of computing systems in a computer network; a plurality of storage devices in the computer network; and a computer program executed by a computing device comprising at least one computer processor performing the following: (1) querying the plurality of computing systems for each system's usage of the plurality of storage devices within a computer network; (2) receiving, from each of the computing systems, raw data comprising a logical identifier and a unique identifier for each storage device used; (3) processing the raw data to identify a correlation between the logical identifier and the unique identifier and a physical storage device; and (4) identifying one of the physical storage devices that is not in use.

In one embodiment, the logical identifier may include a logical unit number, and the unique identifier comprises a unique device identifier.

In one embodiment, the step of identifying one of the physical storage device that is not in use may include querying each physical storage device for usage activity. The usage activity may be IOPS executed on the physical storage device, reads or writes executed on the physical storage device, etc.

In one embodiment, the computer program may decommission the physical storage device, reallocate the physical storage device, etc.

In one embodiment, the computing system may include a VIOS system, an AIX system, a Linux system, a Windows system, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for identifying unused storage capacity within a computer network are disclosed.

Embodiments disclosed here are directed to systems and methods for identifying unused storage capacity within a computer network. In embodiments, raw data from SAN storage allocations from, for example, AIX VIOs and client LPARs may be collected and processed. In one embodiment, a physical disk may be identified using a combination of the logical unit number ("LUN"), the SAN serial number, and the unique device identifier ("UDID") of the SAN disk. In one embodiment, a shared AIX VIOs/LPARs list may be provided for each SAN storage disk, or LUN. In one embodiment, a report with a listing or view of unused and total capacity for each AIX VIOs/LPARs may be generated, and the report may be searched by, for example, LPARs/VIOs, SAN frame, UDID, IBM frame serial, etc.

Although the disclosure may refer to specific hardware products (e.g., IBM's AIX, VIOs, etc.), it should be recognized that the disclosure is not so limited and other SAN storage hardware, models, vendors, computer systems, etc. may be used as is necessary and/or desired. For example, embodiments may be used with different operating systems, such as AIX/VIOS, Linux, and Windows. For example, embodiments may identify the unused storage information in Linux or Windows using the appropriate commands/program to retrieve the UDID/LUN (or similar) serial number information in those systems. The unique identification for same disk, however, may differ in Linux/Windows from that in AIX/VIOS systems. Thus, additional co-relationship identifications may be required to identify if single storage devices allocated to AIX, Linux, Windows, or another operating system. For example, other disk identifiers (e.g., universal unique identifier (UUID), etc.) may be used to identify the physical storage.

Figure 1:
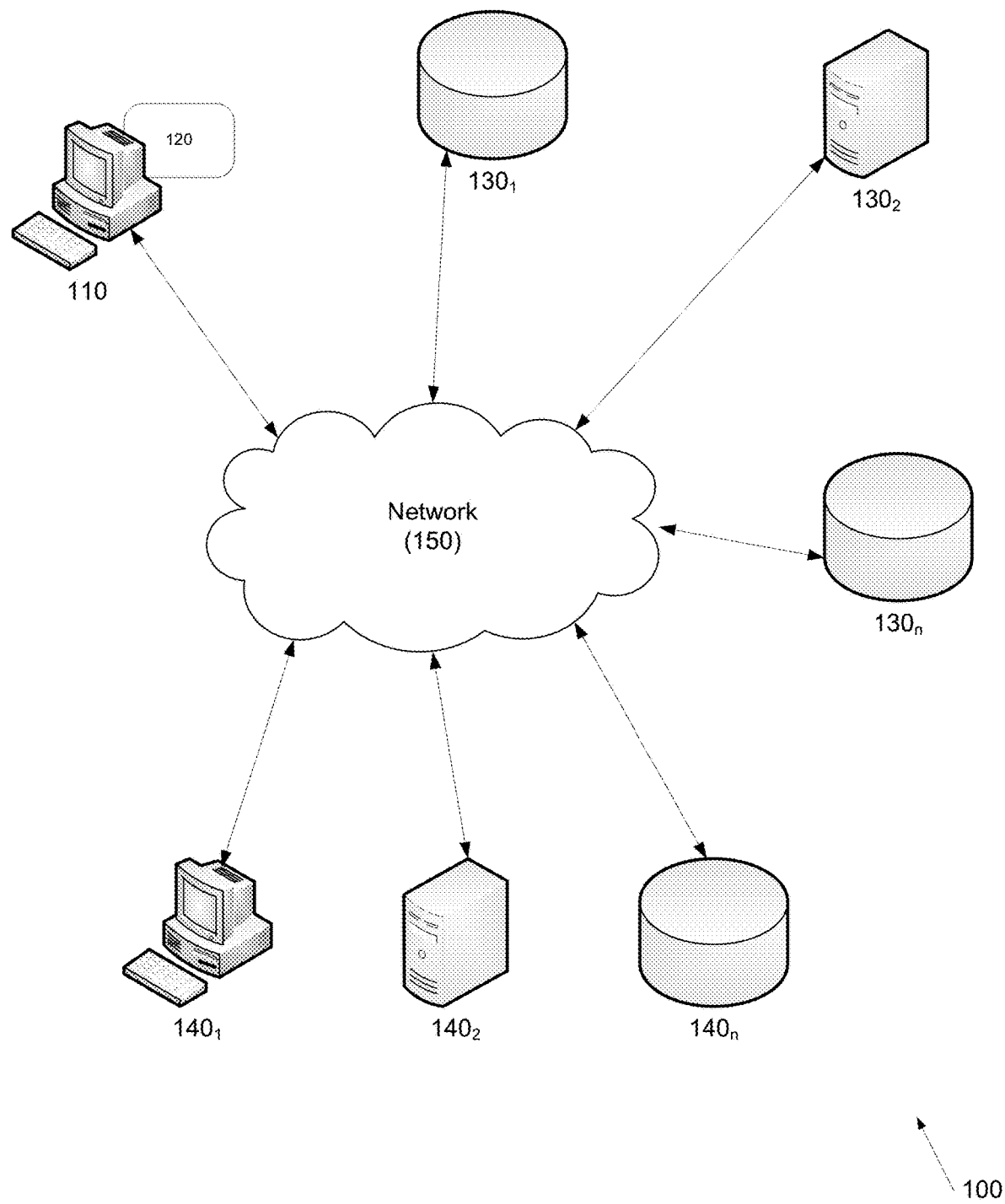
FIG. 1 depicts a system for identifying unused storage capacity within a computer network according to one embodiment.

Referring to FIG. 1, a system for identifying unused storage capacity within a computer network are disclosed according to one embodiment. System 100 may include electronic device 110 that may execute one or more computer programs and/or applications 120 that may identity storage used by storage devices within computer network 150. For example, electronic device 110 may be a server, a workstation, a desktop computer, a notebook computer, a tablet computer, an Internet of Things ("IoT") appliance, etc. Any suitable electronic device may be used.

Computer network 150 (e.g., a LAN, a WAN, etc.) may include a plurality of electronic devices 130 having storage. Examples may include network attached storages $130_1$, servers $130_2$ (e.g., AIX LPAR, VIO servers, Linux servers, Windows servers, etc.), etc. Any electronic device having storage that may be used with a logical identifier by another computing device may be used as is necessary and/or desired.

In one embodiment, as discussed above, storage on devices 130 may be associated with one or more identifier. For example, each SAN disk may be associated with, or assigned, a logical unit number ("LUN") and a unique device identifier ("UDID"). In one embodiment, the LUN and/or UDID may be assigned by one of the computing systems 140 within computing network 150.

System 100 may further include computing systems 140 that may access storage on one or more electronic devices 130. In one embodiment, computing system 140 may be any suitable computing device, including server $140_1$, workstation, desktop computer, notebook computer, tablet computer $140_2$, database $140_n$, an Internet of Things appliance (not shown), etc. In one embodiment, computing system 140 may access storage on one or more storage device 130.

Figure 2:
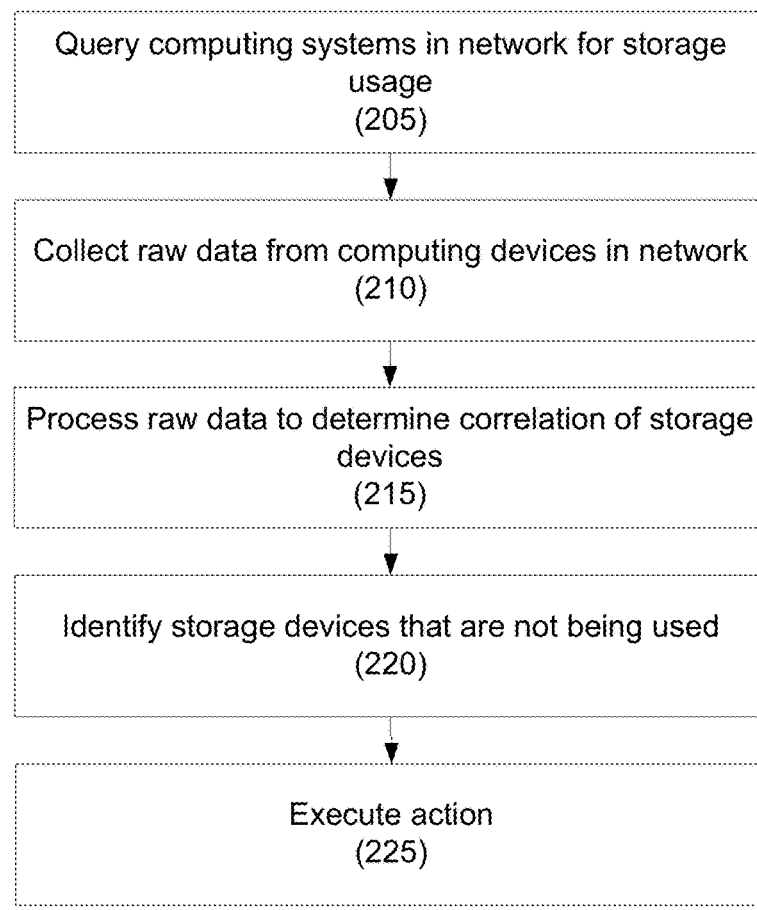
FIG. 2 depicts a method for identifying unused storage capacity within a computer network according to one embodiment.

Referring to FIG. 2, a method for identifying unused storage capacity within a computer network are disclosed according to one embodiment.

In step 205, a computer application or computer program executed by a computing device (e.g., a server, workstation, desktop computer, laptop computer, notebook computer, tablet computer, IoT, etc.) may query one or more computing systems within a computer network for their usage of storage within the computer network. In one embodiment, a remote execute framework, such as CFEngine, may be used for this query. Any suitable framework, commands, etc. may be used as is necessary and/or desired.

In one embodiment, servers, such as AIX LPAR, VIO servers, Linux servers, Windows servers, etc. may be queried. Other servers and devices may be queried as is necessary and/or desired.

In one embodiment, a specific script may be required to interact with each network device depending on the computing system type (e.g., operating system, etc.).

In step 210, raw data may be collected from each of the computing systems in the computer network that may identify the network storage and usage thereof within the computer network. For example, the raw data may include a logical identifier (e.g., a LUN), one or more identifier (e.g., a SAN serial number, a unique device identifier (UDID), etc.), a Logical Volume Manager (LVM), filesystem information, raw disk usage information, activity information (e.g., IOPS), database membership information, etc. Any other identifiers and/or usage information may be received and/or used as is necessary and/or desired.

The raw data may be collected periodically, or as is necessary and/or desired. In one embodiment, the raw data may be collected from different servers at different intervals, in different manners, etc., and may be copied to a central server.

In step 215, the raw data may be processed to determine a correlation between the storage devices in the computer network and a usage of each storage device. For example, the LUNs and UDIDs of each storage device may be used to identify the physical storage (e.g., a disk) that is being used, and the amount of usage by each client device may be determined from the raw data.

In step 220, based on the usage information, any storage devices that are not being used may be identified, and, in step 230, physical storage devices that are not being used may be identified.

In step 225, one or more action, such as implementing an organizational policy for unused storage, may be executed. In one embodiment, the action may be taken automatically; in another embodiment, the action may be taken manually; in still another embodiment, the action may be taken using a combination of manual and automatic actions.

For example, storage devices that are not being used may be decommissioned. Examples of decommissioning decisioning are disclosed in U.S. Provisional Patent Application Ser. No. 62/469,586 and U.S. patent application Ser. No. 15/918,504, the disclosures of which are hereby incorporated, by reference, in their entireties.

In another embodiment, storage devices that are not being used may be reallocated.

In one embodiment, load-balancing across two or more servers may be performed. In another embodiment, unused SAN storage capacity from one server may be transferred to another, enabling the transferring server to be taken offline for cost savings (e.g., maintenance, operational, etc.).

In one embodiment, storage consolidation and/or data migration may be performed.

In one embodiment, reporting may be performed. For example, the reporting may provide information on the storage devices in the network, the servers and other devices that are using those storage devices, the percent the storage devices are used, etc.

In one embodiment, a report including a summary of all virtual disk mapping with physical disk and devices may be provided. This may establish virtual mapping in case of a server recovery. It may also identify unused SAN LUNs in the network.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying unused storage capacity within a computer network comprising:
   in an information processing apparatus comprising at least one computer processor:
      querying a plurality of servers for an amount of storage on a plurality of storage devices within a computer network used by each server;
      receiving, from each of the servers, raw data comprising a logical identifier and a unique identifier for each storage device used;
      processing the raw data to identify a correlation between the logical identifier and the unique identifier and a physical storage device; and
      identifying one of the physical storage devices that is not in use.

2. The method of claim 1, wherein the logical identifier comprises a logical unit number, and the unique identifier comprises a unique device identifier.

3. The method of claim 1, wherein the step of identifying one of the physical storage devices that is not in use comprises:
   querying each physical storage device for usage activity.

4. The method of claim 3, wherein the usage activity comprises IOPS executed on the physical storage device.

5. The method of claim 3, wherein the usage activity comprises reads or writes executed on the physical storage device.

6. The method of claim 1, further comprising decommissioning the physical storage device.

7. The method of claim 1, further comprising reallocating the physical storage device.

8. The method of claim 1, wherein the computing system comprises a VIOS system.

9. The method of claim 1, wherein the computing system comprises an AIX system.

10. The method of claim 1, wherein the computing system comprises a Linux system.

11. The method of claim 1, wherein the computing system comprises a Windows system.

12. A system for identifying unused storage capacity within a computer network comprising:

a plurality of servers in a computer network;
a plurality of storage devices in the computer network; and
a computer program executed by a computing device comprising at least one computer processor performing the following:
  querying the plurality of servers for an amount of storage on a plurality of storage devices within a computer network used by each server;
  receiving, from each of the servers, raw data comprising a logical identifier and a unique identifier for each storage device used;
  processing the raw data to identify a correlation between the logical identifier and the unique identifier and a physical storage device; and
  identifying one of the physical storage devices that is not in use.

13. The system of claim 12, wherein the logical identifier comprises a logical unit number, and the unique identifier comprises a unique device identifier.

14. The system of claim 12, wherein the step of identifying one of the physical storage devices that is not in use comprises:
  querying each physical storage device for usage activity.

15. The system of claim 14, wherein the usage activity comprises IOPS executed on the physical storage device.

16. The system of claim 14, wherein the usage activity comprises reads or writes executed on the physical storage device.

17. The system of claim 12, wherein the computer program decommissions the physical storage device.

18. The system of claim 12, wherein the computer program reallocates the physical storage device.

19. The system of claim 12, wherein the computing system comprises a VIOS system.

20. The system of claim 12, wherein the computing system comprises an AIX system.

* * * * *